United States Patent [19]

Ponticelli et al.

[11] Patent Number: 5,228,652
[45] Date of Patent: Jul. 20, 1993

[54] PANEL ASSEMBLY FOR USE IN VARIOUSLY MOUNTING RADIO EQUIPMENT IN VEHICLES

[76] Inventors: Robert J. Ponticelli, 2251 Monaco, Oxnard, Calif. 93035; Pasco C. Ponticelli, Jr., 2051 Via Veneto, Camarillo, Calif. 93010

[21] Appl. No.: 617,776

[22] Filed: Nov. 26, 1990

[51] Int. Cl.⁵ .................................... G12B 9/00
[52] U.S. Cl. .................................... 248/27.1
[58] Field of Search ............ 248/27.1, 544, 674, 248/675, 27.3, 57, 70, 73, 200, 200.1, 223.4, 297.2, 298, 906; 160/250, 255, 902, 903; 312/7.1; 220/3.5, 3.6, 3.9; 174/58; 361/417, 419, 422, 427; 455/345

[56] References Cited

U.S. PATENT DOCUMENTS

| | | | |
|---|---|---|---|
| 1,056,759 | 3/1913 | Mallery | 220/3.9 |
| 1,211,182 | 1/1917 | Kruse | 248/906 |
| 2,547,447 | 4/1951 | De Boer | 312/7.1 |
| 3,685,879 | 8/1972 | Tsuji | 312/7.1 |
| 3,906,371 | 9/1975 | Tsuji | 361/422 |
| 3,922,047 | 11/1975 | Tsuji | 312/7.1 |
| 4,067,654 | 1/1978 | Maniaci | 312/7.1 |
| 4,068,175 | 1/1978 | Maniaci | 455/345 |
| 4,211,976 | 7/1980 | Inoue | 455/345 |
| 4,238,139 | 12/1980 | Suzuki | 312/7.1 |
| 4,245,872 | 1/1981 | Kakigi | 312/7.2 |
| 4,406,386 | 9/1983 | Rasor | 248/297.2 |
| 4,560,124 | 12/1985 | Alves | 248/27.1 |
| 4,572,465 | 2/1986 | Rasca | 248/27.1 |
| 4,699,341 | 10/1987 | Ponticelli | 248/27.1 |
| 4,742,978 | 5/1988 | Ponticelli | 248/27.1 |
| 5,005,792 | 4/1991 | Rinderer | 248/906 |

FOREIGN PATENT DOCUMENTS 1275642 8/1968 Fed. Rep. of Germany ....... 312/7.1

Primary Examiner—David M. Purol
Attorney, Agent, or Firm—Edward A. Sokolski

[57] ABSTRACT

A rectangular frame has two pairs of opposing runners formed along the inner edges of the longitudinal sides thereof which are normally oriented horizontally. The pairs of runners are separated from each other by a space large enough to accomodate the installation of a panel member in each such pair of runners. The panel members have a slider arrangement means formed along the top and bottom edges thereof, the slider arrangement matingly engages an associated pair of the runners for slidable positioning therealong. The panel members have apertures formed therein through which radio control shafts can be fitted. Such panel members can be selectively positioned along their associated runners to accomodate shafts located in various positions. Various such panel members having different mounting structures are provided to suit a variety of different mounting installations.

4 Claims, 3 Drawing Sheets

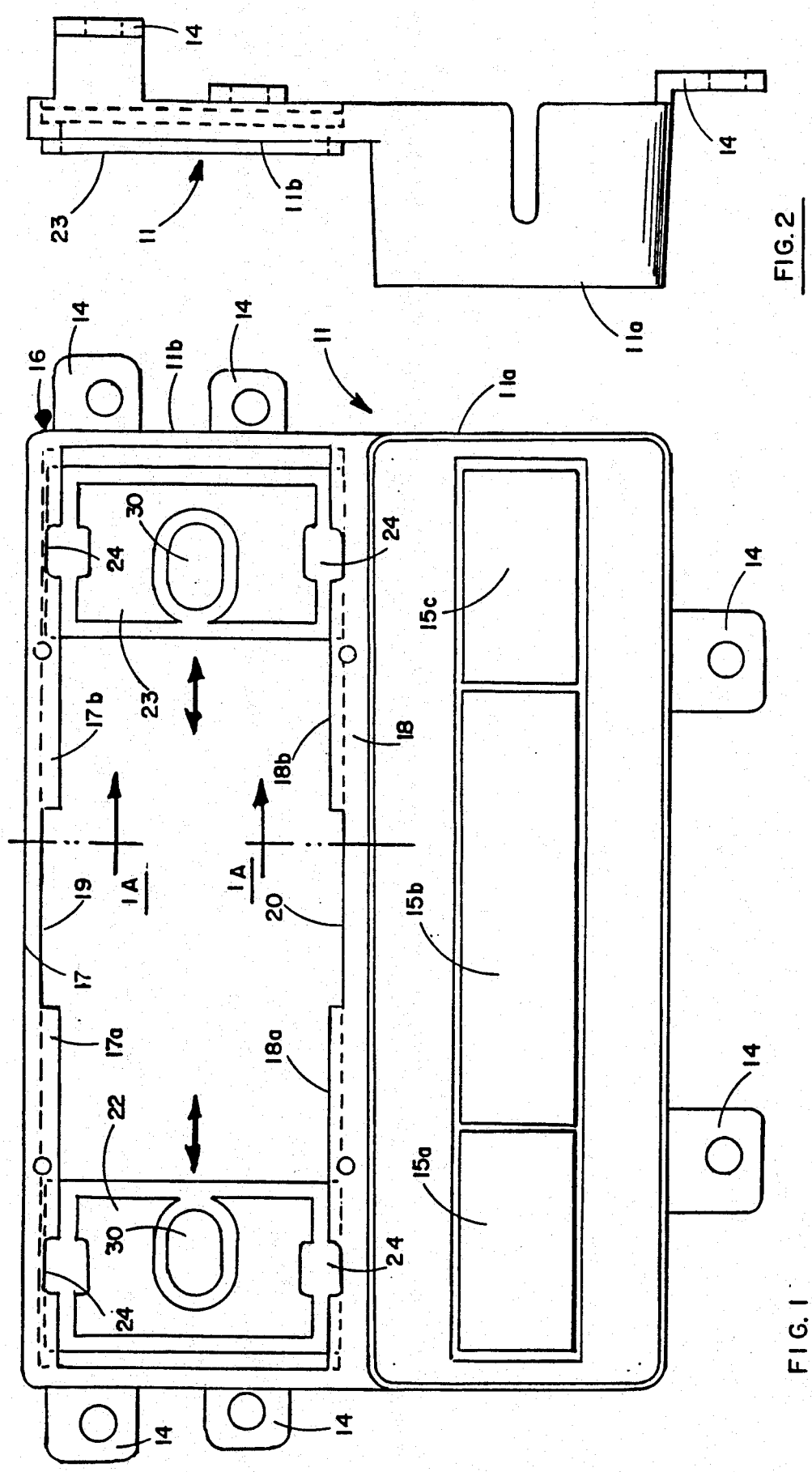

PANEL ASSEMBLY FOR USE IN VARIOUSLY MOUNTING RADIO EQUIPMENT IN VEHICLES

BACKGROUND OF THE INVENTION

1. Field of the Invention

This invention relates to devices for use in installing radio equipment in vehicles and more particularly to a panel assembly for such a device which can be adapted for use in a variety of different radio installations.

2. Description of the Related Art

With the great variety of different vehicles and radio equipment available for installation therein, it is necessary to provide a great variety of different mounting hardware and panels to suit the individual installation requirements for each vehicle and radio equipment. In the past, this has required the provision of a great variety of components for use with different radio equipment as installed in each particular vehicle.

This problem has been alleviated by providing universal mounting systems as described in various patents such as U.S. Pat. No. 4,742,978, issued May 10, 1988 to Robert J. Ponticelli; U.S. Pat. No. 4,699,341 issued Oct. 13, 1987 to Robert J. Ponticelli; U.S. Pat. No. 4,067,654 issued Jan. 10, 1978 to Robert P. Maniaci; U.S. Pat. No. 3,685,879 issued Aug. 22, 1972 to Tom T. Tsuji; U.S. Pat. No. 4,560,124 issued Dec. 24, 1985 to Roger J. Alves; and U.S. Pat. No. 3,922,047 issued Nov. 25, 1975 to Tom T. Tsuji.

In the Tsuji and Alves patents, elongated openings are provided in the panels to permit a small range of lateral adjustment of the panels to accomodate different radios having different spacings between their control shafts. In Ponticelli('978) and Maniaci, openings for the control shafts which are enlarged both horizontally and vertically are provided to permit a limited range of accommodation to shafts located in various positions.

SUMMARY OF THE INVENTION

The device of the present invention is an improvement over the devices of the aforementioned prior art patents having the ability to accommodate a variety of radio shaft positions in that it both permits a much wider range of positional adjustment and allows for the ready installation of a variety of different panel assemblies in the mounting frame which can be used in attaching the frame to different support structures.

The device of the present invention achieves this improved end result by employing a pair of panel members having slider means along the opposite edges thereof. The frame has oppositely positioned pairs of runners running along the inner edges of the opposite horizontal portions thereof. An opening is provided between the pairs of runners to permit the installation of the panel members on the left and right sides of the frame with the slider means thereof riding on the runners for slidable positioning therealong. The panel members have apertures formed therein for receiving the shafts of a radio or other electronic equipment therethrough. The positions of these apertures can be adjusted over a wide range by slidable positioning of the panel members along the runners of the frame as may be desired. A variety of different panel assemblies can readily be installed in the frame, such panel assemblies having different mounting structures for attachment to different mounting supports.

DESCRIPTION OF THE DRAWINGS

FIG. 1 is a front elevational view of a preferred embodiment of the invention;

FIG. 2 is an end elevational view of the preferred embodiment;

DETAILED DESCRIPTION OF THE INVENTION

Figure 4:
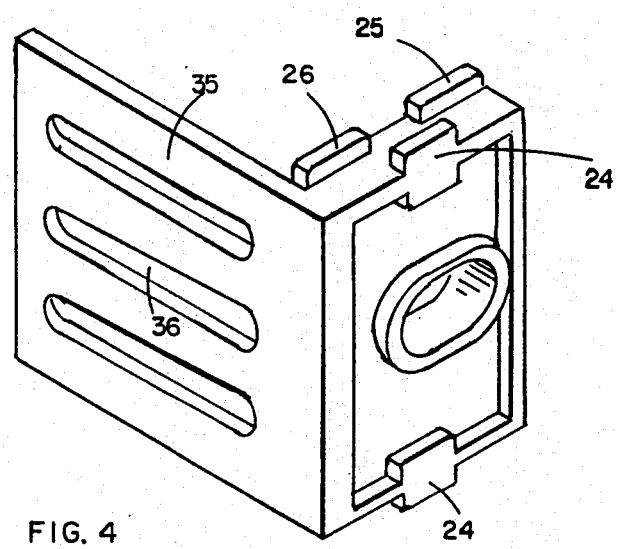
FIG. 4 is a side perspective view of a first alternative type of panel member which may be employed in the device of the invention.

Referring to FIGS. 1–3A, a preferred embodiment of the invention is illustrated. Panel assembly 11 has a lower portion 11a and an upper portion 11b which can be used to house sound or radio equipment in a vehicle. The panel assembly can be attached to the dashboard of the vehicle by means of screws which fit through apertured mounting tabs 14. Lower portion 11a has panel sections 15a-15c which are adapted to be selectively removed as may be required to accommodate different sound and radio installations. Upper portion 11b has an open frame 16. A first pair of runners 17a, 17b are formed along the inner edge of the upper frame portion 17 and a second pair of runners 18a and 18b are formed along the inner edge of the lower frame portion 18. Spaces 19 and 20 are provided between runners 17a and 17b and 18a and 18b respectively, these spaces being large enough to permit the installation of panel members 22 and 23 in the runners.

Figure 3:
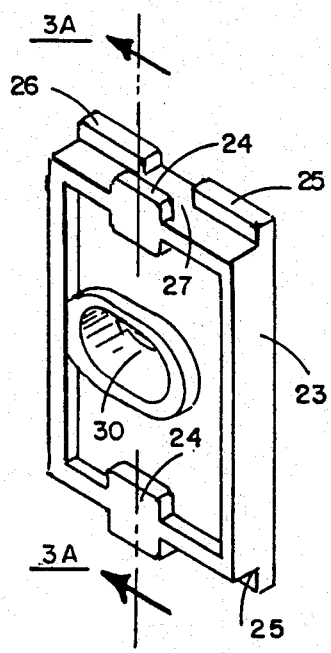
FIG. 3 is a perspective view of a panel member of the preferred embodiment.
Figure 3A:
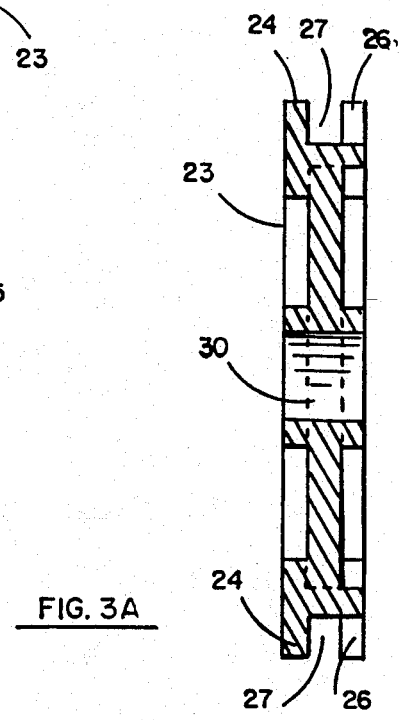
FIG. 3A is a cross sectional view taken along the plane indicated by 3A—3A in FIG. 3.
Figure 1A:
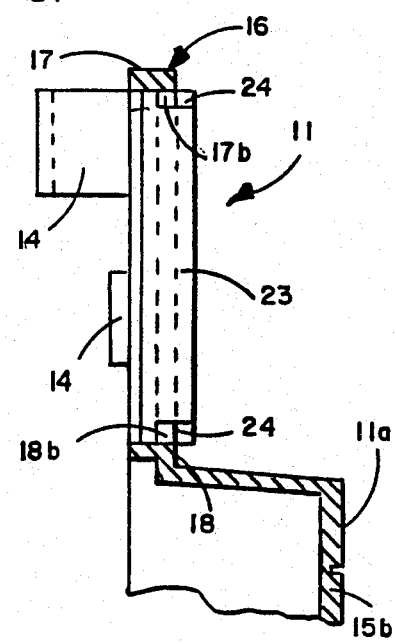
FIG. 1A is a cross sectional view taken along the plane indicated by 1A—1A in FIG. 1.

As best can be seen in FIGS. 3 and 3A, the two panel members 22 and 23 are similar except that panel member 22 is adapted for installation in the left portion of the frame while panel member 23 is adapted for installation in the right portion thereof. Slider means for enabling slidable positioning of the panel members along the runners 17a, 17b, 18a, and 18b is provided in each of the panel members by single elongated projection 24 formed on one side of the panel members and paired elongated projections 25 and 26, these projections effectively forming a channel 27 therebetween in which the runners ride. Elongated apertures 30 are formed in the panel members for receiving the control shafts of the equipment being mounted. The positions along the frame of each of panel members 22 and 23 can be varied to accomodate different equipments having various spacings between their control shafts.

Figure 5:
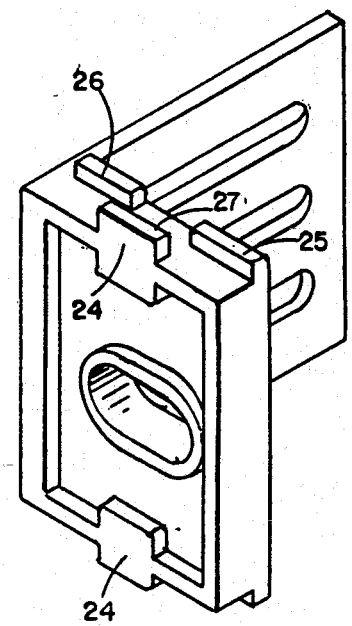
FIG. 5 is a front perspective view of the panel member shown in FIG. 4.

Referring now to FIGS. 4 and 5, a first alternative configuration for the panel members of the invention is shown. This panel member is slidably installed along the runners of the frame in the same manner as that of the preferred embodiment. However, a bracket 35 having mounting slots 36 formed therein is incorporated in the panel member, this mounting bracket being used in mounting the panel assembly. In this second embodiment variable positioning of the panel members along the runners is limited.

Figure 6:
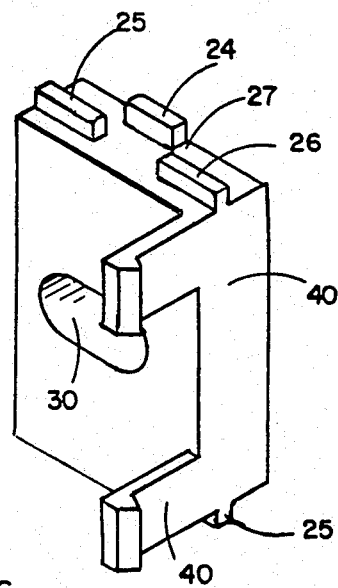
FIG. 6 is a rear perspective view of a second alternative type of panel member which may be employed in the device of the invention.
Figure 7:
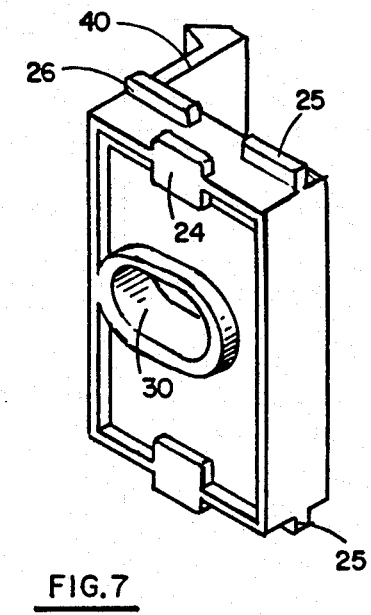
FIG. 7 is a front perspective view of the panel member shown in FIG. 6.

Referring now to FIGS. 6 and 7 a second alternative configuration for the panel members is shown. This embodiment is slidably mounted on the runners in the same manner as the previously described embodiments but as for the embodiment of FIGS. 4 and 5 includes means for mounting the panel assembly. In this embodiment such mounting means is provided by a pair of arms 40 which have pointed end portions which can be fitted into mating slots in a support member. With this type of mounting, the adjustment of the panel members relative to each other is limited.

Figure 8:
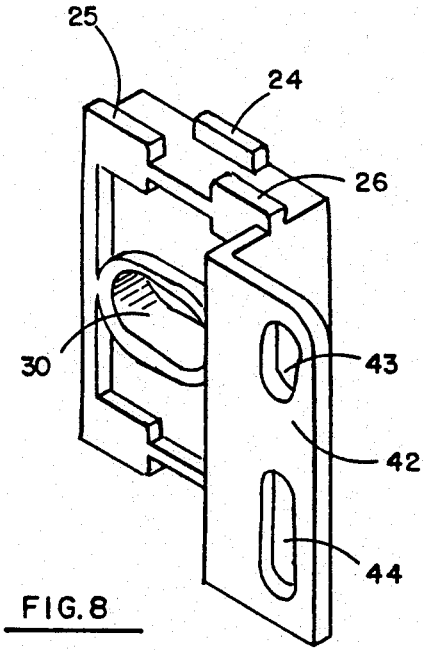
FIG. 8 is a rear perspective view of a third alternative type of panel member which may be used in the device of the invention.
Figure 9:
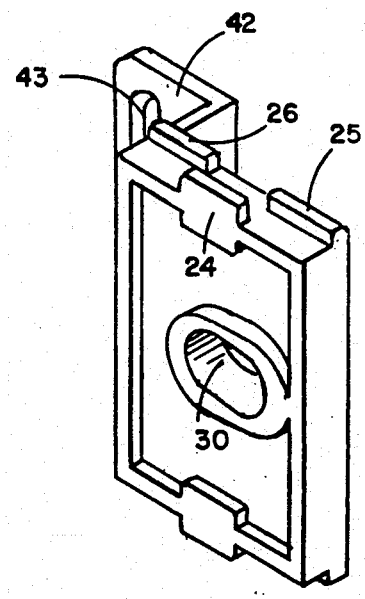
FIG. 9 is a front perspective view of the panel member shown in FIG. 8.

Referring now to FIGS. 8 and 9, a second alternative configuration for the panel members is illustrated. In this embodiment a mounting bracket 42 having apertures 43 and 44 formed therein for receiving mounting hardware is provided for each panel member. As for the two prior embodiments, this mounting bracket may be utilized to mount the assembly in the vehicle. The panel members are similarly installed in the frame but with the brackets attached to the support structure, lateral movement of the panel members is limited.

While the invention has been described and illustrated in detail, it is to be clearly understood that this is intended by way of illustration and example only and is not to be taken by way of limitation, the scope of the invention being limited only by the terms of the following claims.

We claim:

1. A panel assembly for use in variously mounting radio equipment in a vehicle comprising:
    a rectangular open frame having runners formed along the inner edges of both of the longitudinal sides thereof,
    a pair of panel members, each of said panel members having a broad surface and opposite edges located along opposite ends of said surface, said panel members further having slider means formed along each of said edges, said slider means matingly engaging said runners to enable slidable positioning of said panels therealong,
    said panel members each having an aperture formed through the broad surface thereof through which a radio control shaft can be fitted,
    whereby said panel members can be selectively positioned along the runners to receive radio control shafts fitted through the apertures thereof.

2. The panel assembly of claim 1 wherein there are two pairs of runners, the runners of each pair being positioned in opposing relationship to each other on opposite sides of said frame, there being a space between the runners of said first and second pairs located in the central portion of said frame in which any one of said panels can be fitted.

3. The panel assembly of claim 1 wherein said slider means are formed by projections extending normally from the edges of said panel members.

4. A panel member for variously mounting radio equipment in a vehicle comprising:
    a rectangular open frame member have runners formed along the inner edges of both of the longitudinal sides thereof,
    a pair of panel members, each of said panel members having a broad surface and opposite edges located along opposite ends of said surface, each of said panel members further having slider means formed along each of said edges, said slider means comprising a first projection extending from said edge along one side thereof and a pair of projections spaced from each other extending from said edge along the side thereof opposite to said one side thereof, said slider means engaging said runners to enable slidable positioning of said panels therealong,
    whereby said panel members can be selectively positioned along the runners.

* * * * *